United States Patent
Ozawa

(10) Patent No.: US 7,747,164 B2
(45) Date of Patent: Jun. 29, 2010

(54) WAVELENGTH DIVISION MULTIPLEXING TRANSMISSION SYSTEM, WAVELENGTH DIVISION MULTIPLEXING TRANSMISSION APPARATUS AND METHOD FOR CONTROLLING WAVELENGTH DIVISION MULTIPLEXING TRANSMISSION APPARATUS

(75) Inventor: Kimio Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 924 days.

(21) Appl. No.: 11/390,083

(22) Filed: Mar. 28, 2006

(65) Prior Publication Data

US 2006/0216028 A1    Sep. 28, 2006

(30) Foreign Application Priority Data

Mar. 28, 2005 (JP) .............................. 2005-093319

(51) Int. Cl.
*H04B 10/00* (2006.01)
(52) U.S. Cl. .................................. 398/7; 398/8; 398/34
(58) Field of Classification Search .................. 398/7–9, 398/45, 67, 72, 34
See application file for complete search history.

(56) References Cited

U.S. PATENT DOCUMENTS

| | | | | |
|---|---|---|---|---|
| 5,539,564 | A * | 7/1996 | Kumozaki et al. ............. | 398/2 |
| 6,915,075 | B1 * | 7/2005 | Oberg et al. .................... | 398/9 |
| 2003/0059160 | A1 * | 3/2003 | Rikitake et al. ................ | 385/24 |
| 2003/0123785 | A1 * | 7/2003 | Sugitani et al. ................ | 385/16 |
| 2004/0240485 | A1 * | 12/2004 | Lipski et al. .................. | 370/537 |
| 2006/0018658 | A1 * | 1/2006 | Mori ........................... | 398/79 |

FOREIGN PATENT DOCUMENTS

| | | |
|---|---|---|
| JP | 55-136742 | 10/1980 |
| JP | 58-221534 | 12/1983 |
| JP | 04-053316 | 2/1992 |
| JP | 2004-32306 | 1/2004 |
| JP | 2004-032306 | 1/2004 |
| JP | 2004-096514 | 3/2004 |

OTHER PUBLICATIONS

Japanese Office Action dated Mar. 2, 2010 with a partial English translation.

\* cited by examiner

*Primary Examiner*—Dzung D Tran
(74) *Attorney, Agent, or Firm*—McGinn IP Law Group, PLLC

(57) ABSTRACT

A wavelength division multiplexing transmission system that comprises an input/output terminal station for an optical signal, and an intermediate station located between the terminal stations and connected by an optical transmission line for performing wavelength division multiplexing and transmission of the optical signal, wherein the signal transmission system comprising the terminal station and the intermediate station has a redundant configuration comprising the active system and standby system, and an input/output means for the optical signal to be transmitted through the active system and the standby system is provided on both the active system and the standby system on the side of the active system of the terminal station.

33 Claims, 10 Drawing Sheets

FIG. 5

300 WAVELENGTH NUMBER DETERMINATION INFORMATION

| PORT SETTING | PRESENCE OR ABSENCE OF OPTICAL SIGNAL IN THE INPUT PORT OF OMUX | PRESENCE OR ABSENCE OF INDIVIDUAL WAVELENGTH COMMUNICATED FROM OSC TO OMUX | DETERMINATION RESULT OF THE PRESENCE OR ABSENCE OF WAVELENGTH BY OMUX |
|---|---|---|---|
| END | PRESENT | IGNORE | PRESENT |
| END | ABSENT | IGNORE | ABSENT |
| PASS-THROUGH | PRESENT | PRESENT | PRESENT |
| PASS-THROUGH | PRESENT | ABSENT | ABSENT (DETERMINED AS NOISE) |
| PASS-THROUGH | ABSENT | IGNORE | ABSENT |

FIG. 7

400 LIMITATION INFORMATION SETTING DIAGRAM

| POSITIONAL INFORMATION | CONNECTION INFORMATION | CLOCK INFORMATION |
|---|---|---|
| UPSTREAM ON LINE1 | ABSENT | I N T |
| UPSTREAM ON LINE1 | PRESENT | S L V 1 |
| UPSTREAM ON LINE2 | ABSENT | S L V 2 |
| UPSTREAM ON LINE2 | PRESENT | S L V 2 |

WAVELENGTH DIVISION MULTIPLEXING TRANSMISSION SYSTEM, WAVELENGTH DIVISION MULTIPLEXING TRANSMISSION APPARATUS AND METHOD FOR CONTROLLING WAVELENGTH DIVISION MULTIPLEXING TRANSMISSION APPARATUS

BACKGROUNDS OF THE INVENTION

1. Field of the Invention

The present invention relates to wavelength division multiplexing transmission of optical signals, and, more particularly, to a wavelength division multiplexing transmission system, a wavelength division multiplexing transmission apparatus and a method for controlling wavelength division multiplexing transmission apparatus, allowing an economical redundant configuration to be achieved.

2. Description of the Related Art

FIG. 10 illustrates an example of configuration of a conventional wavelength division multiplexing (WDM) transmission apparatus.

As shown in FIG. 10, the conventional wavelength division multiplexing transmission system comprises nodes A, B, C, D and so on, and transmits optical signals by the following actions.

The nodes A and D each use a transponder (TPND) to convert into electricity an optical signal entered from a client (device) and 3R regenerate (Retime, Regenerate and Reshape) the signal for conversion into signals having a plurality of light wavelengths defined by ITU-T Grid (optical interface wavelength spacing according to ITU-T G. 692), use an optical multiplexer (OMUX) to multiplex and deliver the signals having a plurality of wavelengths as wavelength multiplexed signals, while at the same time, use a transmission amplifier (TXA) to amplify the delivered wavelength multiplexed signal for transmission through a transmission line.

Relay stations having integrated link adapters (ILAs), which are relay adapters, amplify and relay the wavelength multiplexed signals that flow through the transmission lines between the nodes A and B, and between the nodes C and D, respectively.

The nodes B and C each use a receive amplifier (RXA) to amplify the wavelength multiplexed signals transmitted through the transmission lines from the nodes A and D, respectively, and use an optical demultiplexer (ODMUX) to demultiplex the signals into signals having a plurality of wavelengths defined by the ITU-T Grid and to transmit the signals as optical signals to the respective opposite nodes B and C.

Each of the nodes B and C also comprises a back to back transponder (BBTPND) for converting into electricity the optical signals transmitted by the respective opposite nodes B and C, 3R regenerating and entering the signals into the OMUX.

Further, each of the nodes A, B, C and D comprises an optical supervisory channel (OSC) for extracting information on the number of multiple wavelengths in the wavelength multiplexed signal that is required to amplify the wavelength multiplexed signal (amplification using TXA and RXA) from a transmission line, respectively, sending it out to a different transmission line within the same node, and performing wavelength multiplexing of the signal into an optical signal from which information on the number of multiple wavelengths has been extracted.

Finally, the nodes A and D each amplify (RXA) the wavelength multiplexed signal entered through the transmission line from each of the nodes B and C, demultiplex (ODMUX) the signal into signals having a plurality of defined wavelengths, and deliver the signals as optical signals to the client through the TPND.

However, such a conventional configuration poses the problem that transmission cannot be achieved if any of the functions of the wavelength division multiplexing transmission system fails.

Thus, in order to solve the above problem, for example, Japanese Patent Laid-open No. 2004-32306 (Document 1) discloses a wavelength multiplexing transmission apparatus having a redundant configuration comprising an active system and a standby system, which monitors switching command information and a switching factor occurrence notification for the active system and the standby system originating from the failure of a function or the like, and is capable of switching to the standby system device if transmission of a signal cannot be carried out with the active system.

However, such a conventional wavelength division multiplexing transmission apparatus has the following problems.

A first problem is that the task of achieving a redundant configuration comprising an active system and a standby system is very difficult.

The reason is, when nodes are added to achieve a redundant configuration comprising an active system and a standby system, in order to control the nodes, it is necessary to consider a prescribed redundant configuration to predefine the implementation position and various settings of each node, leading to the control being very complicated. This made the task of achieving a redundant configuration by adding an extra new active system or standby system difficult.

A second problem is that when attempting to double the circuit with a wavelength division system that configures the active system and a wavelength division system that configures the standby system, the configuration becomes complicated, as a circuit for communicating control information is required.

The reason is, as each of the active system package and the standby system package monitors and keeps as information each other's circuit quality state to switch the circuit to the one with a better circuit quality between the TPNDs with a redundant configuration, a circuit is required for transmitting between the packages control information between the respective TPNDs that are implemented in the active system package and the standby system package.

A third problem is that, although the transmission distance is one that does not require regeneration relay of the optical signal for such reason as transmission is within the same station, hardware parts such as BBTPND are necessary, which is costly.

The reasons are as follows.

Normally, if the transmission distance is one that does not require regeneration and relay, a direct connection using an optical patch cord or the like is advantageous in terms of cost.

Further, because an optical amplifier has to adjust the level of excitation light in tune with the number of wavelengths of an optical signal to be entered, if the level of the excitation light in tune with the number of wavelengths is not entered, the level of the excitation light per wavelength becomes higher or lower than a design value; therefore, the targeted transmission performance would not be achieved. Therefore, the level of the excitation light to be entered per wavelength needs to be controlled by counting the number of wavelengths correctly.

However, in wavelength division multiplexing transmission, optical amplification with an erbium-doped optical fiber amplifier (EDFA) accumulates noise every time the relay is repeated. Therefore, if a signal is transmitted directly using an optical patch cord, the input unit of the OMUX sometimes detects the light power level, not of a signal but of noise, and erroneously recognizes the noise as a signal; therefore, it may not count the number of wavelengths of the optical signal correctly.

Besides, since the number of wavelengths of the optical signal cannot be counted correctly, the level of excitation light in tune with the number of wavelengths cannot be adjusted accurately; therefore, the quality of the transmission of the optical signal to be transmitted is significantly reduced.

For the above reasons, in order to count the number of wavelengths correctly, a BBTPND for converting an optical signal into an electrical signal and determining whether or not the signal is correct was needed, thus requiring a cost corresponding to the BBTPND.

SUMMARY OF THE INVENTION

An object of the present invention is to provide a wavelength division multiplexing transmission system, a wavelength division multiplexing transmission apparatus and a method for controlling wavelength division multiplexing transmission apparatus that can easily achieve a redundant configuration comprising an active system and a standby system in the wavelength division multiplexing transmission system.

Further, another object of the present invention is to provide a wavelength division multiplexing transmission system, a wavelength division multiplexing transmission apparatus and a method for controlling wavelength division multiplexing transmission apparatus that can reduce cost by reducing the number of hardware parts.

To achieve the above objects, the present invention is a wavelength division multiplexing transmission system comprising input/output terminal stations for an optical signal and an intermediate station located between the terminal stations and connected by an optical transmission line for performing wavelength division multiplexing and transmission of the optical signal, a signal transmission system comprising the terminal stations and the intermediate station having a redundant configuration comprising the active system and the standby system, and the input/output means for the optical signal to be transmitted through the active system or the standby system being provided on both the active system and the standby system, on the side of the active system of the terminal station.

According to the present invention having such a configuration, the optical signal is entered only by the input/output means provided on the active system of the terminal station, passes through the active system and the standby system on the input side of the terminal station, the active system and the standby system of the intermediate station, and the active system and the standby system on the output side of the terminal station, and is delivered only from the input/output means on the output side of the terminal station.

In addition, the present invention has a configuration for transmitting between nodes in the intermediate station, multiple wavelength number information indicating the number of multiple wavelengths of the optical signal contained in the optical signal to be transmitted through a communication bus different from the transmission line for the optical signal, to downstream nodes.

According to the present invention having such a configuration, the multiple wavelength number information extracted from the optical signal is transmitted to the downstream nodes through the additionally provided communication bus different from the original transmission line for the optical signal.

As described above, the effect of the present invention is an easy realization of a redundant configuration comprising an active system and a standby system in a wavelength division multiplexing transmission system.

The reason is, by providing an input/output means for the optical signal to be transmitted through the active system or the standby system on both the active system and the standby system on the side of the active system of the input/output terminal stations for an optical signal, control between the active system and the standby system in transmitting the optical signal becomes easy.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 5 shows a diagram illustrating wavelength number determination information of the input port of an OMUX according to the first embodiment of the present invention;

FIG. 7 shows a diagram illustrating settings of control information for clock synchronization of an SC according to the concrete example 1 corresponding to the first embodiment of the present invention;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First Embodiment

Figure 1:
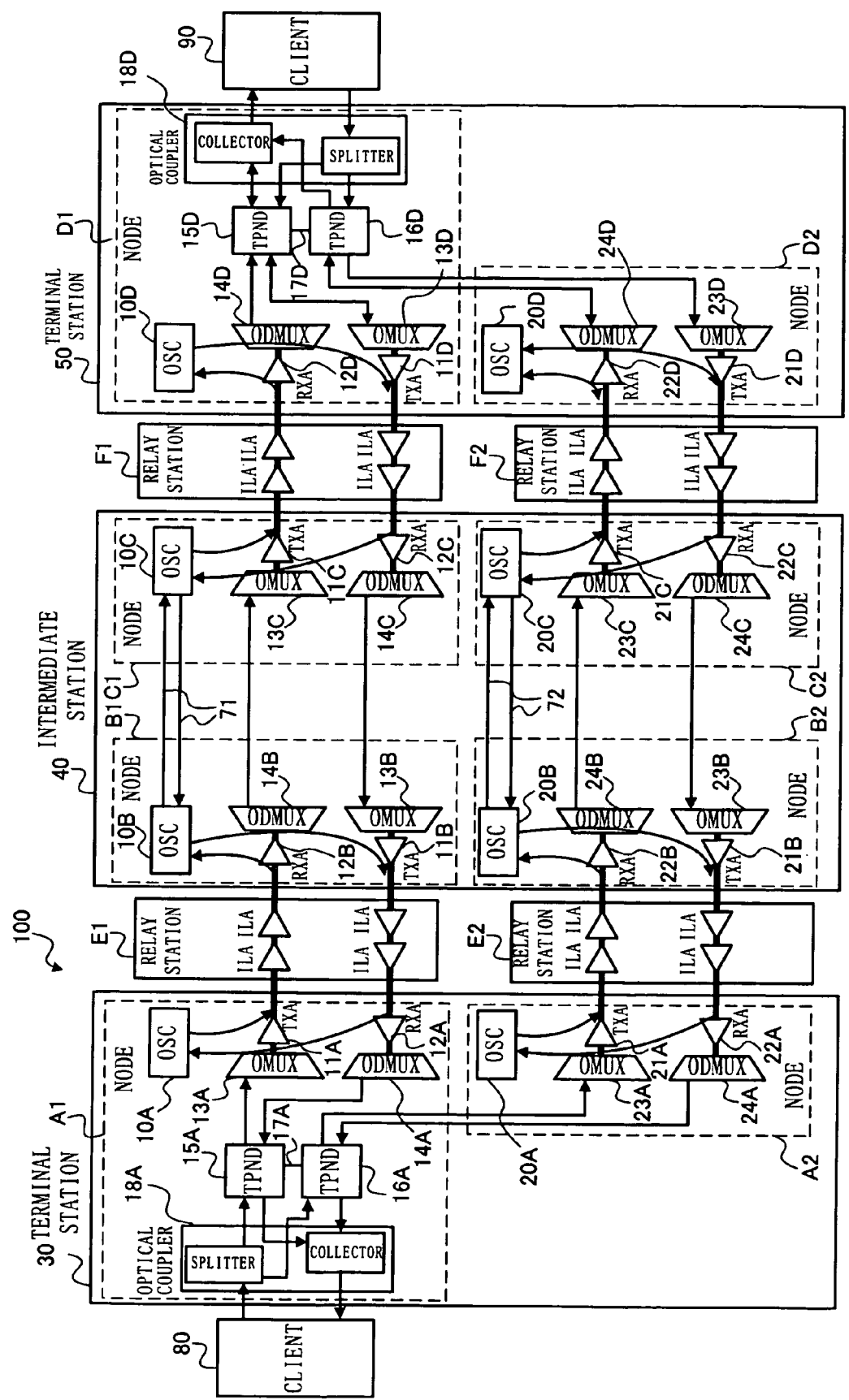
FIG. 1 shows a schematic diagram illustrating the basic configuration of a wavelength division multiplexing transmission system according to a first embodiment of the present invention.

FIG. 1 shows a schematic diagram illustrating the configuration of a wavelength division multiplexing (WDM) transmission system 100 according to a first embodiment of the present invention.

Referring to FIG. 1, the wavelength division multiplexing transmission system 100 is an apparatus for delivering an optical signal entered from a client 80 on the outside at one side to another client 90 on the outside at the other side by relaying the signal with wavelength division multiplexing transmission.

The wavelength division multiplexing transmission system 100 also comprises a signal transmission system having a redundant configuration comprising an active system and a standby system, the signal transmission system comprising terminal stations (station houses) 30 and 50 located at positions for entering and delivering optical signals between the clients 80 and 90, and an intermediate station (station house) 40 connected by transmission lines located between the terminal stations 30 and 50.

The wavelength division multiplexing transmission system 100 comprises nodes A1, A2, B1, B2, C1, C2, D1 and D2 (hereinafter, referred to as A1-D1, A2-D2, and so on, as appropriate), and relay stations E1, E2, F1, F2 or the like, having integrated link adapters (ILA).

Here, the nodes A1-D1 and the relay stations E1 and F1 are the active systems; on the other hand, the nodes A2-D2 and the relay stations E2 and F2 are the standby systems.

In addition, the nodes A1, A2, D1 and D2 are wavelength division multiplexing transmission apparatuses that configure the terminal stations (station houses) 30 and 50, and the nodes B1, B2, C1 and C2 are wavelength division multiplexing transmission apparatuses that configure the intermediate station (station house) 40, both having function for entering/delivering an optical signal, and performing wavelength division multiplexing of the entered/delivered optical signal for transmission.

As shown in FIG. 1, in the wavelength division multiplexing transmission system 100, each node has one set each among OSCs 10A-10D and 20A-20D, TXAs 11A-11D and 21A-21D, RXAs 12A-12D and 22A-22D, OMUXs 13A-13D and 23A-23D, and ODMUXs 14A-14D and 24A-24D.

Further, the TPNDs 15A and 16A, and the TPNDs 15D and 17D are connected by communication buses 17A and 17D, respectively, to have a redundant configuration as a set of two, and are disposed in the nodes A1 and D1, which are active systems.

Furthermore, optical couplers 18A and 18D for splitting the optical signal entered from the external clients 80 and 90 to deliver the signals to the TPNDs 15A and 16A or the TPNDs 15D and 17D, and collecting the optical signals entered from the TPNDs 15A and 16A or the TPNDs 15D and 17D to deliver the signal to the outside, are also disposed in the nodes A1 and D1.

Here, an optical multiplexer (OMUX) is an apparatus having a plurality of input ports for multiplexing signals having a plurality of wavelengths entered from the input port, and deliver the signals as a wavelength multiplexed signal to the transmission line.

An optical demultiplexer (ODMUX) is an apparatus having a plurality of output ports for demultiplexing the wavelength multiplexed signal entered from the transmission line into signals having a plurality of wavelengths defined by ITU-T Grid, and transmitting the signals as optical signals to the opposite OMUX.

A transmission amplifier (TXA) is an apparatus for amplifying the wavelength multiplexed signal delivered from the OMUX, and transmitting the signal through the transmission line.

An receive amplifier (RXA) is an apparatus for amplifying the wavelength multiplexed signal entered from the transmission line, and transmitting the signal to the ODMUX.

An optical supervisory channel (OSC) is an apparatus for retrieving from the wavelength multiplexed signal being transmitted, information on the number of the multiple wavelengths that is required to amplify the wavelength multiplexed signal at the TXA and the RXA, sending it out to a different transmission line within the same node, and performing wavelength multiplexing of the signal into a main signal that is the wavelength multiplexed signal from which the wavelength multiplexed signal is retrieved.

A transponder (TPND) is an apparatus, which is an interface unit for entering/delivering the optical signal from the client, for converting into electricity the optical signal entered from the client (device), 3R regenerating (Retime, Regenerate and Reshape) the signal for conversion into signals having a plurality of light wavelengths defined by ITU-T Grid (optical interface wavelength spacing according to ITU-T G. 692), delivering the signals to the OMUX, while at the same time, converting into electricity the optical signal entered from the ODMUX, 3R regenerating and delivering the signal to the client.

The nodes A1 and A2 which are the active system and the standby system, are disposed in the station house 30, which is the terminal station.

In the active system node A1 of these nodes A1 and A2, both of the TPNDs 15A and 16A are implemented. The inputs/outputs of the wavelength division multiplexing side of the TPNDs 15A and 16A are connected to the OMUXs 13A and 23A, and the ODMUXs 14A and 24A of the nodes A1 and A2, respectively, and enter/deliver the optical signal between the OMUXs 13A and 23A, and the ODMUXs 14A and 24A.

Similarly, the nodes B1, B2, C1 and C2 of the active system and the standby system are disposed in the station house 40, which is the intermediate station.

Between the nodes B1 and C1, the outputs of the ODMUX 14B are connected to the OMUX 13C through an optical patch cord, and the outputs of the ODMUX 14C are connected to the OMUX 13B through an optical patch cord.

Similarly, between the nodes B2 and C2, the ODMUX 24B and the OMUX 23C, and the ODMUX 24C and the OMUX 23B are connected through optical patch cords, respectively.

Further, between the nodes B1 and C1, and between the nodes B2 and C2 are zones where supervisory channel (SV) signals described below are transmitted to and received from the OSCs 10B and 10C, and the OSCs 20B and 20C, respectively.

In addition to the conventional functions of the OSC described above, the OSCs 10B, 20B, 10C, and 20C have a function for transmitting to and receiving from the respective opposite OSCs 10B, 20B, 10C and 20C, the SV signal containing information on the number of multiple wavelengths retrieved from the wavelength multiplexed signal to be transmitted, through the inter-OSC communication buses 71 and 72 that are different from the transmission line for the main signal that is the wavelength multiplexed signal from which the number of multiple wavelengths is retrieved, and a function for retrieving the information on the number of multiple wavelengths from the SV signal received from the opposite OSCs 10B, 20B, 10C and 20C.

The SV signal described herein is a signal for transmitting to/receiving from the nodes, management data containing information on the number of multiple wavelengths of the signal in a general line by using a wavelength different from that of a signal for the general line for wavelength division multiplexing.

The nodes D1 and D2 of the active system and the standby system have the same configuration as that of the nodes A1 and A2, and are disposed in the station house 50, which is the terminal station.

Both the TPNDs 15D and 16D are implemented in the node D1. The inputs/outputs of the wavelength division multiplexing side of the TPNSs 15D and 16D are connected to the OMUXs 13D and 23D, and the ODMUXs 14D and 24D of the nodes D1 and D2, respectively, and enter/deliver the optical signal between the OMUXs 13D and 23D, and the ODMUXs 14D and 24D.

The relay stations E1, E2, F1 and F2, each having ILAs, are apparatuses for amplifying and relaying the wavelength multiplexed signal flowing through the transmission line between the nodes A1 and B1, the nodes A2 and B2, the nodes C1 and D1, and the nodes C2 and D2.

In this way, the wavelength division multiplexing transmission system 100 has a configuration in which the TPNDs 15A, 16A, 15D and 16D for entering/delivering the optical signal to be transmitted through the active system or the standby system are provided on both the active system and standby system, on the active system side of the terminal stations 30 and 50.

In addition, in this embodiment, although the TPNDs 15A, 16A, 15D and 16D are provided on the active system side of the terminal stations 30 and 50, they may be provided on the standby system side of the terminal stations 30 and 50.

Next, the configuration of the nodes A1 and A2 will be described in detail by referring to FIG. 2.

Figure 2:
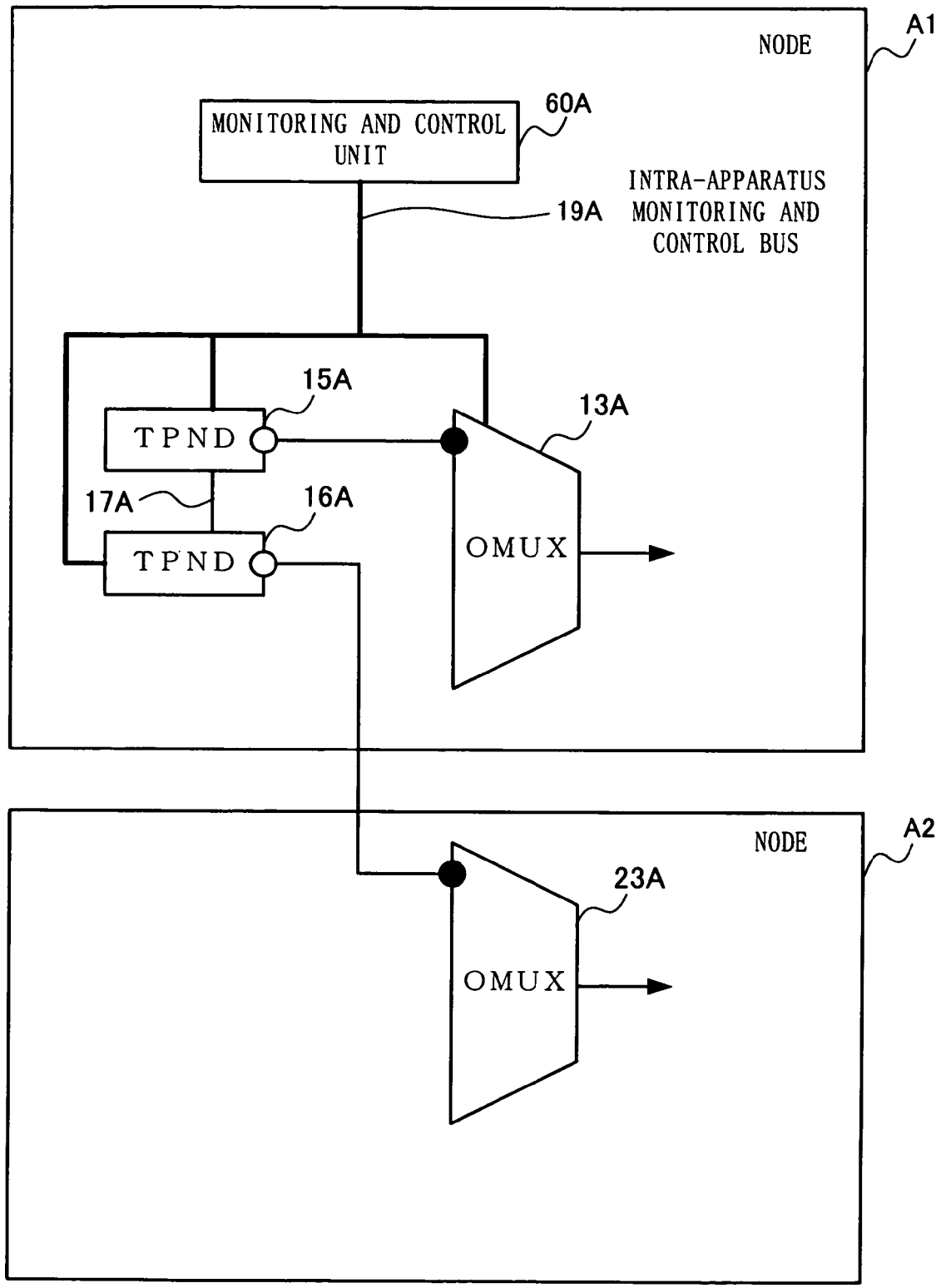
FIG. 2 shows a schematic diagram illustrating a portion of the configuration of nodes A1 and A2 according to the first embodiment of the present invention.

FIG. 2 shows a schematic diagram illustrating a portion of the configuration of nodes A1 and A2.

Referring to FIG. 2, the TPNDs 15A and 16A, which are a set of two, are disposed on the side of the node A1; on the other hand, the OMUXs 13A and 23A connected to the TPNDs 15A and 16A are disposed in the active system node A1 or the standby system node A2, respectively. A monitoring and control unit 60A for monitoring and controlling each function is disposed on the side of the active system node A1, and connected to the TPNDs 15A and 16A and the OMUXs 13A through an intra-apparatus monitoring and control bus 19A.

By having such a configuration, even in a redundant configuration, there is no need to add a control bus for controlling the overall wavelength division multiplexing transmission system, including newly added active system and standby system, allowing the cost to be held down.

In addition, the nodes D1 and D2 have the same configuration as that of the nodes A1 and A2.

Figure 3:
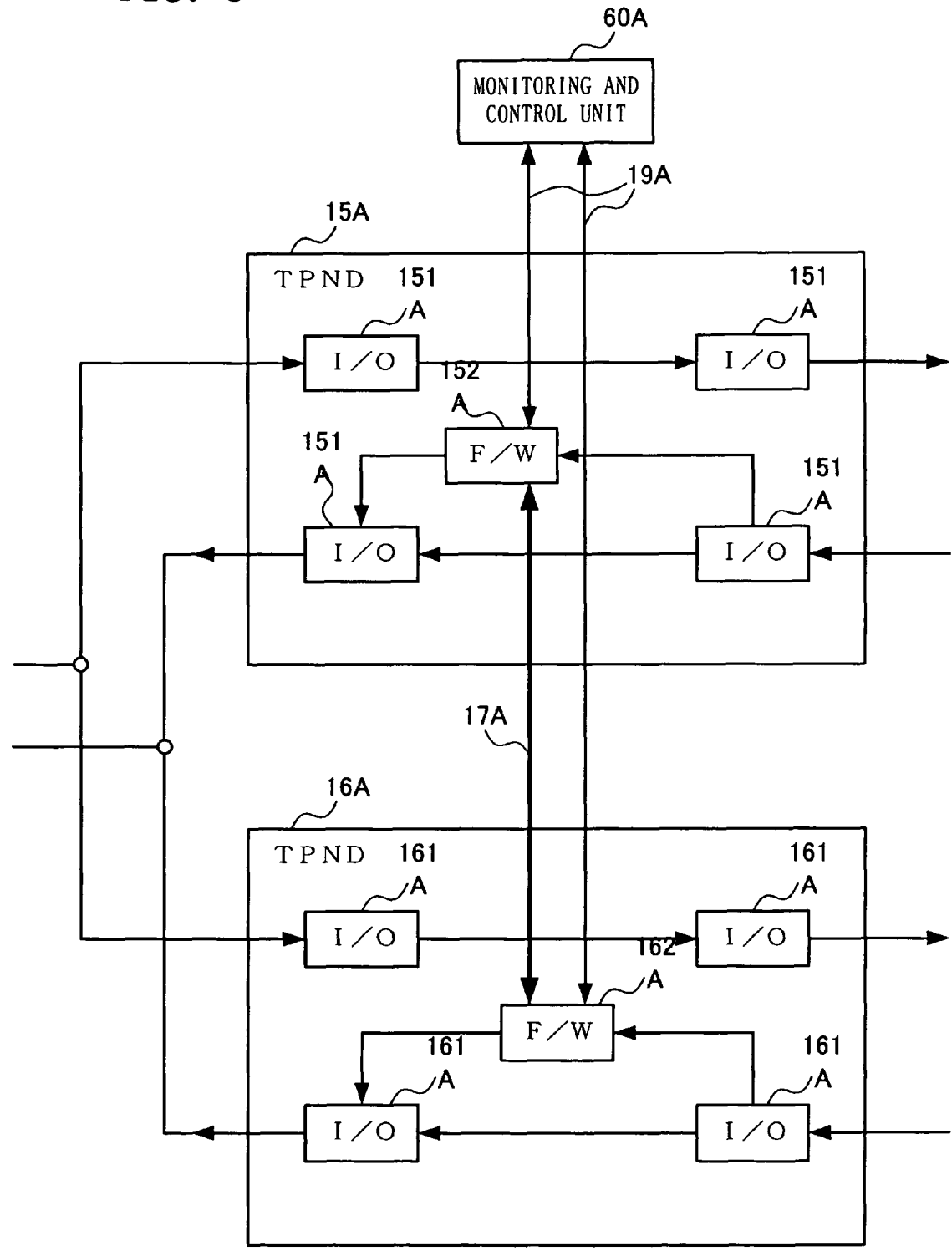
FIG. 3 shows a block diagram illustrating the configuration of a TPNDs 15A and 16A according to the first embodiment of the present invention.

FIG. 3 is a block diagram illustrating the configuration of the TPNDs 15A and 16A.

The TPNDs 15A and 16A comprise input/output units 151A and 161A, and firmware units 152A and 162A.

The TPNDs 15A and 16A are interconnected by the communication bus 17A, and are respectively connected to the monitoring and control unit 60A through the intra-apparatus monitoring and control bus 19A.

The input/output units 151A and 161A convert into electricity and 3R regenerate the optical signal entered from the client 80 for conversion into signals having a plurality of light wavelengths defined, and deliver the signals to the OMUXs 13A and 23A, while at the same time, converting into electricity and 3R regenerating the optical signal entered from the ODMUXs 14A and 24A, and delivering the signal to the client 80.

The firmware units 152A and 162A reciprocally monitor each other's TPND signal condition through the communication bus 17A, and perform control so that the TPND on the side of the line that is transmitting a better quality signal delivers the signal to the client side.

Next, the configuration of the nodes B1 and C1 will be described in detail by referring to FIG. 4.

Figure 4:
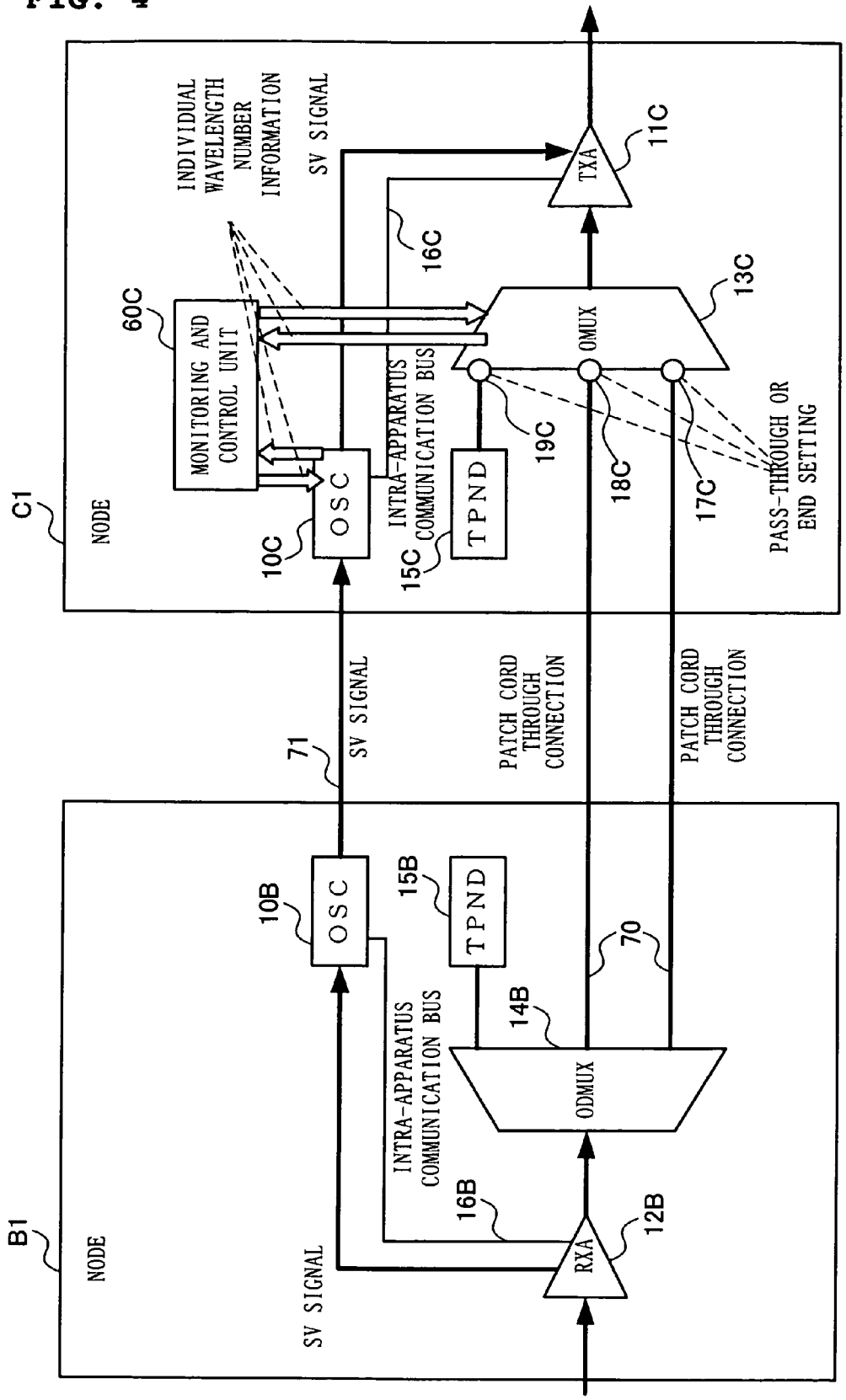
FIG. 4 shows a schematic diagram illustrating a portion of the configuration between nodes B1 and C1 according to the first embodiment of the present invention.

FIG. 4 shows a schematic diagram illustrating a portion of the configuration of nodes B1 and C1. As shown in FIG. 4, the node B1 has the RXA 12B for amplifying the wavelength multiplexed signal entered from the transmission line, the OSC10B for extracting from the wavelength multiplexed signal the SV signal containing an individual wavelength number information described below and receiving the extracted SV signal through an SV signal communication bus 16B, the ODMUX 14B for entering the main signal, which is the wavelength multiplexed signal after the SV signal has been extracted and delivering the main signal through a plurality of output ports (not shown), and the TPND 15B.

The individual wavelength number information is information that shows the number of individual wavelengths in the wavelength multiplexed signal, is contained in the SV signal and forwarded from the upstream station node B1 to the downstream station node C1.

The node C1 comprises the OSC 10C for receiving through the inter-OSC communication bus 71 the SV signal from the OSC 10B and transmitting through the intra-apparatus communication bus 16C the SV signal to the TXA 11C, the OMUX 13C patch cord through connected to the ODMUX 14B via an optical patch cord 70 for entering the main signal delivered from the ODMUX 14B from a plurality of input ports 17C, 18C and 19C, the monitoring and control unit 60C for transmitting to and receiving from the OSC 10 and the OMUX 13C the individual wavelength number information, the TPND 15C, and the TXA11C for amplifying the wavelength multiplexed signal to be delivered to the transmission line.

In addition, between the OSCs 10B and 10C of the nodes B1 and C1 connected back to back, as the OSCs are in the same station house 40, the transmission distance is one that does not require regeneration relay and wavelength division multiplexing is also not necessary; therefore, inexpensive 1.5 um optical module is employed rather than expensive 1.6 um optical module.

Next, an example of the operation of the nodes B1 and C1 will be described.

Referring to FIG. 4, the OSC 10 notifies the monitoring and control unit 60C of the individual wavelength number information to be transmitted using the SV signal from the upstream node B1. The monitoring and control unit 60 C notifies the OMUX 13C of the individual wavelength number information, and performs settings of the input ports 17C, 18C and 19C on the OMUX 13C. The OMUX 13C has a photodetector (PD, not shown) at the input ports 17C, 18C and 19C, and detects the power level of the optical signal entered through the input ports 17C, 18C and 19C.

The OMUX 13C determines the number of multiple wavelengths of the optical signal transmitted between the nodes B1 and C1 in the intermediate station based on the notified multiple wavelength number information and the detected power level of the optical signal.

In addition, "pass-through or end" described below is set on each of the input port 17C, 18C and 19C on the OMUX 13C.

A user sets "pass-through" on the input ports 17C and 18C connected by the optical patch cord 70 through the monitoring and control unit 60C via a craft interface terminal or a network.

Meanwhile, the input port 19C for entering the signal from the TPND 15C is set to "end".

FIG. 5 is a diagram illustrating the settings of each input port 17C, 18C and 19C on the OMUX 13C, and the presence or the absence of the signal input.

In the case where the setting is "end" for the input port 19C, the OMUX 13C ignores the presence or the absence of the individual wavelength communicated from the OSC 10C through the monitoring and control unit 60C, and determines that there is a wavelength due to an input signal in the OMUX 13C when there is an optical signal in the input port 19C, on the other hand, determines that there is no wavelength due to an input signal in the OMUX 13C when there is no optical signal in the input port 19C.

In the case where the settings are "pass-through" for the input ports 17C and 18C, when there is an optical signal in the input ports 17C and 18C, the OMUX 13C determines that there is a wavelength due to an input signal in the OMUX 13C if there is an individual wavelength communicated from the OSC 10C, on the other hand, when there is no individual wavelength, the OMUX 13C determines that the signal is noise, and that there is no wavelength due to an input signal in OMUX 13C.

Meanwhile, for example, even if the setting is "pass-through" for the input port, when there is no optical signal in the input port, the OMUX 13C ignores the presence or the absence of the individual wavelength communicated from the OSC 10C to the OMUX 13C, and determines that there is no wavelength due to an input signal in the OMUX 13C.

The OMUX 13C notifies the monitoring and control unit 60C of this determination result as the individual wavelength number information. The monitoring and control unit 60C communicates the result to the OSC 10C, which in turn, places the individual wavelength number information derived from the determination result on the SV signal and communicates it to the transmission line.

In so doing, since recalculation of the individual wavelength number is unnecessary in the OSCs 10B and 10C, the individual wavelength number is communicated from the node B to the node C1 without recalculation.

Since the individual wavelength number is not recalculated, even in a configuration where the sending port and receiving port of the OSC 10B and the OSC 10C are connected to the receiving port and the sending port of the respective opposite OSC through an inexpensive optical patch cord or electrical cable, the individual wavelength number of the optical signal to be transmitted between the nodes B1 and C1, and the B2 and C2 can be determined correctly.

The first embodiment of the present invention produces the following effects by the above-mentioned configuration and operation between the nodes B1 and C1.

Figure 10:
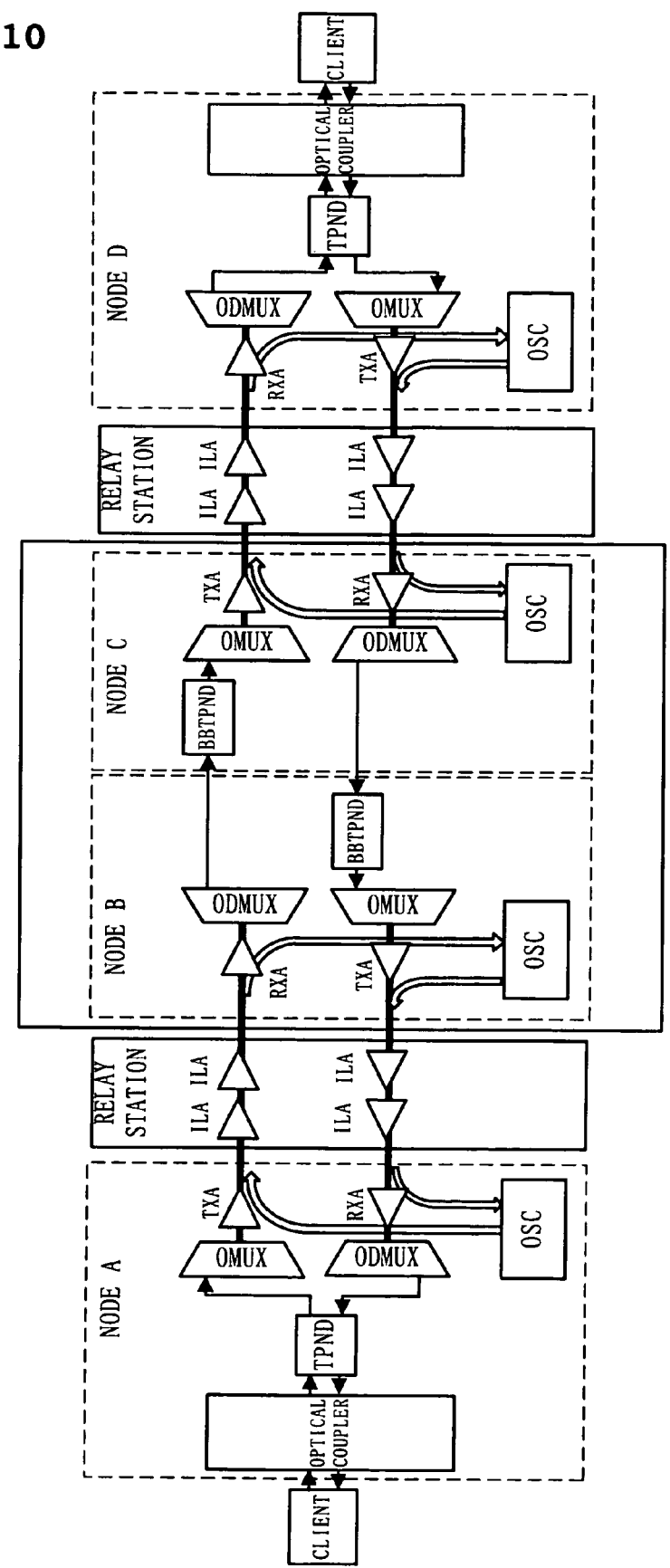
FIG. 10 is a schematic diagram illustrating the basic configuration of a conventional wavelength division multiplexing transmission system.

Conventionally, in the case where the BBTPND is not employed between the nodes B and C as shown in FIG. 10, the individual wavelength number is determined by the presence or the absence of loss of signal (LOS) of the optical level in the input port by channel in the OMUX having a plurality of input ports.

However, in the wavelength division multiplexing transmission, since optical amplification is performed with an Erbium-Doped Optical Fiber Amplifier (EDFA) in the relay station, noise level is increased every time the relay is repeated.

The increase in the noise level causes the input unit of the OMUX to detect the optical level not due to signals but due to noise, and sometimes erroneously recognizes the noise as a signal, even if it is not a signal.

Due to this erroneous recognition, in the nodes B and C shown in FIG. 10, when the ODMUX and the OMUX are through-connected by a patch cord, it is determined that a signal is communicated to the input port of the OMUX, even if the signal is not communicated between them.

That is, it is determined that there is no LOS even if a signal is not communicated. The information indicating the individual wavelength number calculated by erroneous determination and differing from reality is placed on the SV signal and transferred to the downstream apparatus along with the main signal.

In this way, when the BBTPND is not used between nodes B and C, conventionally, sometimes the number of the wavelengths cannot be counted correctly, thereby adversely affecting the wavelength division multiplexing transmission.

Thus, in the present embodiment, by extracting the individual wavelength number information from the wavelength multiplexed signal, and transmitting the information apart from the main signal, it is possible to determine the individual wavelength number correctly, without the BBTPND.

Further, by eliminating the need for the BBTPND, which 3R regenerates and relays the main signal to determine whether or not the signal is correct and reducing the number of hardware parts, an economical path construction that keeps the cost low is possible.

Further, in the OSCs 10B and 10C, the need for the recalculation of the individual wavelength number is eliminated and the individual wavelength number information is communicated from the node B1 to the node C1 without recalculation; thus, even when the BBTPND is not used, it is possible to determine the individual wavelength number correctly without adding the burden of processing.

Furthermore, even in a configuration where the sending port and receiving port of the OSC 10B and the OSC 10C are connected to the receiving port and the sending port of the respective opposite OSC through an inexpensive optical patch cord or electrical cable, the individual wavelength number of the optical signal to be transmitted between the nodes B1 and C1, and the nodes B2 and C2 can be determined correctly, allowing the cost to be kept low.

Next, an example of the operation of the first embodiment will be described.

Referring to FIG. 1, the optical signal delivered from the client is split into two at the optical coupler 18A in the node A1, and the signals are respectively entered into the TPNDs 15A and 16A which are a set of two. The TPNDs 15A and 16A convert the wavelength of the entered optical signals into wavelengths defined by ITU-T Grid, and enter the signals into the OMUXs 13A and 23A, respectively.

The OMUXs 13A and 23A perform wavelength multiplexing of the signals delivered from the TPNDs 15A and 16A, and send out the signals to the TXAs 11A and 21A, respectively. The TXAs 11A and 21A amplify the power level of the input signals entered from the OMUXs 13A and 23A, and send out the signals to the opposite nodes B1 and B2, respectively.

The nodes B1 and B2 use the RXAs 12B and 22B to receive the wavelength multiplexed signals, amplify the power levels, and send out the signals to the ODMUXs 14B and 24B.

The ODMUXs 14B and 24B demultiplex the wavelength multiplexed signals amplified at the RXAs 12B and 22B into wavelengths defined by ITU-T Grid. The demultiplexed signals are sent out to the nodes C1 and C2 as the main signal, and entered into the OMUXs 13C and 23C.

Meanwhile, the OSCs 10B and 20B send out the SV signal containing the information on the number of multiple wavelengths extracted from the wavelength multiplexed signal that has been sent out from the nodes A1 and A2, through a path different from that of the main signal, to the downstream respective opposite 10C and 20C.

The nodes C1 and C2 determine the presence or the absence of the input of an optical signal from the ODMUXs 14B and 24B to the OMUXs 13C and 23C based on the information on the number of the multiple wavelengths of the SV signal, and the optical input level of the main signal entered into the OMUXs 13C and 23C.

The OMUXs 13C and 23C perform wavelength multiplexing of the entered main signal, and send out the signal to the TXAs 11C and 21C. The TXAs 11C and 21C amplify the power level of the input signal comprising the main signal and the SV signal, and send out the signal to the opposite nodes D1 and D2, respectively. The nodes D1 and D2 use the RXAs 12D and 22D to receive the wavelength multiplexed main signal, amplify the power level, and send out the signals to the ODMUXs 14D and 24D. At the ODMUXs 14D and 24D, the wavelength multiplexed signal is demultiplexed into the wavelengths defined by ITU-T Grid.

The signals demultiplexed at the ODMUXs 14D and 24D are entered into the TPNDs 15D and 16D, respectively. The TPNDs 15D and 16D, which are a set of two, reciprocally monitor the signal condition that is the information on each other's TPND, and the TPND on the side of the line that is transmitting a better quality signal delivers the signal to the client. The other TPND stops delivering the signal to the client.

The delivered signal on the client side of the TPNDs 15D and 16D is delivered to the client apparatus through the optical couplers 18D.

In addition, regarding amplification of the wavelength multiplexed signal, since the TXAs11A-11D and 21A-21D and the RXAs12A-12D and 22A-22D have an output level that corresponds to the number of the multiple wavelengths of the wavelength multiplexed signal, information on the number of the multiple wavelengths is necessary to control the output level. The information on the number of the multiple wavelengths is counted on the wavelength input side of the ODMUXs 14A-14D and 24A-24D, and communicated to the OSCs 10A-10D and 20A-20D.

The OSCs 10A-10D and 20A-20D send out the apparatus management signal (SV signal) containing the communicated information on the number of the multiple wavelengths to another transmission line within the same node, and performs wavelength multiplexing of the signal into a wavelength multiplexed signal, which is the main signal.

In the nodes A1 and A2, the information is counted at the wavelength input unit at the ODMUXs 14A and 24A, and communicated to the OSCs 10A and 20A. The OSCs 10A and 20A send out the SV signal containing the information to the transmission line on the output side of the OMUXs 13A and 23A.

By performing wavelength multiplexing of the SV signal into the wavelength multiplexed signal that is the main signal, the information on the number of the multiple wavelengths is communicated to the opposite nodes B1 and B2. The nodes B1 and B2 extract the SV signal from the wavelength multiplexed signal, and enter the signal into the OSCs 10B and 20B in the nodes B1 and B2, respectively. The OSCs 10B and 20B retrieve the information on the number of the multiple wavelengths from the SV signal, and send out the SV signal to the transmission line on the output side of the OSCs 10B and 20B, and OSCs 10C and 20C in the opposite nodes C1 and C2.

The above-mentioned operation allows the number of the wavelengths that is counted upstream to be communicated downstream; thus it is possible to eliminate errors in counting the number of the wavelengths even if the ODMUX and OMUX are directly connected through a patch cord.

Further, the presence or the absence of the signal entered into each input port 17C, 18C and 19C of the OMUXs 13C and 23 can be determined; thus, it is possible to eliminate the need for the determination of the presence or the absence of the main signal using the BBTPND. Thus, by rendering unnecessary the regeneration relay of the main signal, the BBTPND does not need to be used; thus, it is possible to construct the path economically.

Concrete Example 1

Figure 6:
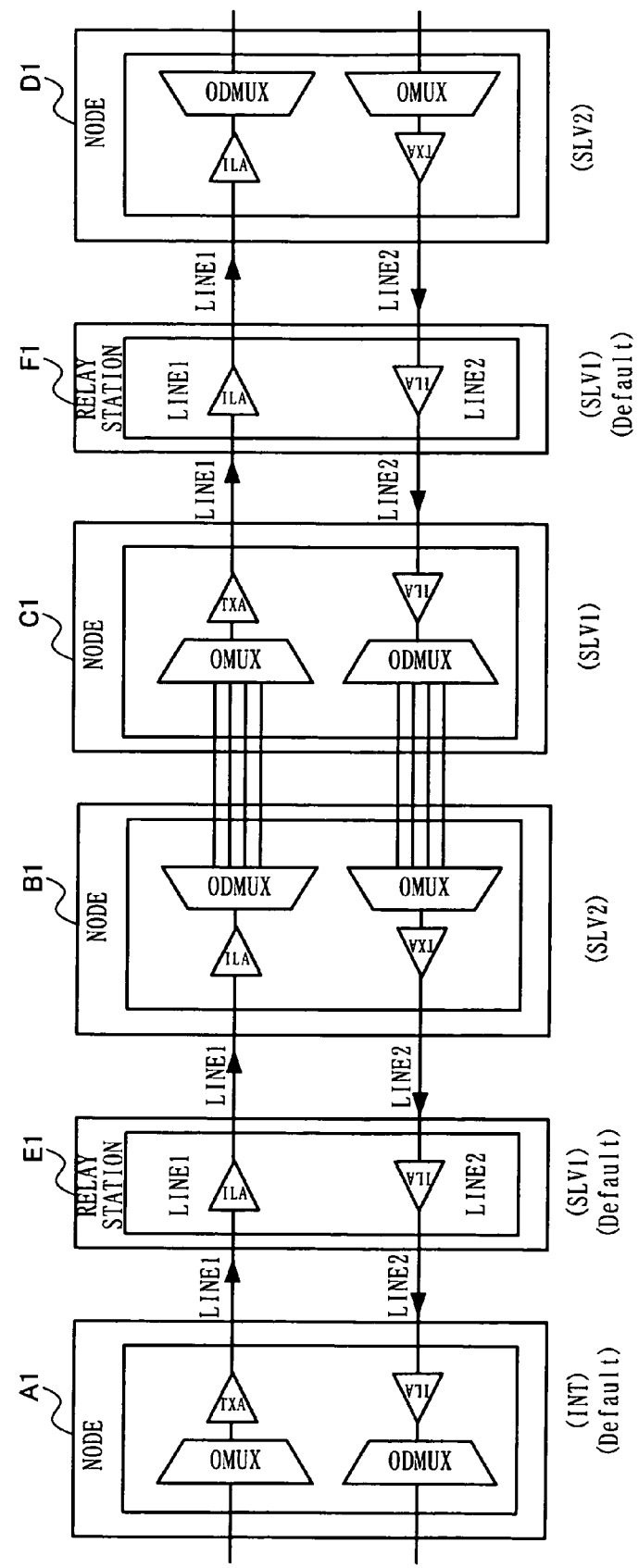
FIG. 6 shows a schematic diagram illustrating a portion of the configuration of a wavelength division multiplexing transmission system according to a concrete example 1 corresponding to the first embodiment of the present invention.

FIG. 6 shows a schematic diagram illustrating a wavelength division multiplexing transmission system according to a concrete example 1 corresponding to the first embodiment of the present invention.

The characteristics of the concrete example 1 shown in FIG. 6 lies in the setting for clock synchronization in the active system where the optical signal is transmitted, in the wavelength division multiplexing transmission system according to the first embodiment shown in FIG. 1. For convenience, only active system where the optical signal is transmitted is illustrated herein.

Referring to FIG. 6, the concrete example comprises the nodes A1-D1 that are a portion of the first embodiment, and, similarly to the first embodiment, the nodes A1 and B1, and the nodes C1 and D1 are connected by optical fibers through the relay stations E1 and F1, respectively, and the nodes B1 and C1 are connected by optical patch cords.

To communicate the SV signal between the OSCs 10B and 10C, the clock synchronization has to be achieved between the communicating nodes B1 and C1.

In the concrete example, to synchronize the clock between the nodes B1 and C1, information about settings, such as node position, is entered as control information when launching the wavelength division multiplexing transmission system 100; thus, setting the base clock signal, which is to be the basis of the clock synchronization, is easy.

In addition, this control information is determined for each node in the terminal station in the active system and the standby system, each node in the intermediate stations, and each relay stations.

Control information, including positional information indicating where the nodes in each terminal station, the nodes in each intermediate station and each relay station are positioned, connection information indicating the connection relationship of the optical signal transmission in the upstream or the downstream direction, and clock information determining the base clock signal, which is to be the basis of the clock synchronization to indicate the master-servant relationship of the base clock signal, is entered into the management control unit 60A using the craft interface terminal or the like, and the base clock signal is set based on this entered control information.

Then, by synchronizing the clock signal between each node in the terminal station in the active system and the standby system, and each node in the intermediate stations based on the entered control information, the SV signal is communicated between the OSCs.

In the concrete example, a master clock signal is set as a base clock signal for clock synchronization between nodes. The setting of how each node and each relay station should be slaved to the master clock signal depends on where each node and each relay station is positioned.

The position of each node and each relay station is determined based on the relationship between each node and each relay station, the LINES 1 and 2, and the direction of the transmission of the signal. As such a determination clearly defines the positional information of each node and each relay station, setting for clock synchronization becomes easy for a user, allowing erroneous settings to be prevented.

FIG. 7 is a diagram illustrating an example of the setting of the control information for clock synchronization of the OSCs.

Referring to FIG. 7, for clock synchronization, the selection of the master clock signal, and the slave setting indicating how each node and each relay station should be slaved to the master clock signal are performed as follows.

Regarding the nodes A1-D1 and the relay stations E1 and F1, the user determines the control information including the positional information, the connection information and the clock information, and enters the control information into the monitoring and control unit 60A directly or through a network or the like.

Here, for the positional information, "upstream on LINE 1" is selected when the nodes A1, B1, C1 and D1 are positioned upstream on the LINE 1, and "upstream on LINE 2" is selected when the nodes A1, B1, C1 and D1 are positioned upstream on the LINE 2.

The connection information is determined by selecting the presence or the absence of the Back to Back connection. In the concrete example, "present" is selected only between the nodes B1 and C1, and "absent" is selected between the other nodes.

Further, the clock information is selected from Initiation (INT), Slave (SLV) 1 and SLV 2.

The clock signal for which INT is selected serves as the master clock signal that is a base clock signal.

For the node or the relay station for which SLV 1 is selected, the relay station is slave to the clock of the Line 1. The nodes are slave to the clock of the input signal from the transmission line.

For the node or the intermediate station for which SLV 2 is selected, the relay station is slave to the clock of the Line 2. The nodes are slave to the clock of the input signal from the node connected Back to Back.

In addition, in selecting the clock information, by setting "INT" on the node A1 and "SLV1" on the relay station by Default, clock synchronization can be achieved with an easy setting.

Referring to FIGS. 6 and 7, the concrete example is set in such a way that, the clock of the signal entered from the outside in the node A is selected as the master clock, and the nodes B1, C1 and D1, and the relay stations E1 and F1 are slaves to the clock of the LINE 1 for operation.

With such a setting, the clock synchronization is achieved in the wavelength division multiplexing transmission system 100 by controlling the monitoring and control unit 60A; thus, the clock between nodes B1 and C1 is synchronized. Since the clock synchronization is achieved between the nodes B1 and C1, the communication of the SV signal between the OSCs 10B and 10C is possible.

In addition, the concrete example is one example of setting for clock synchronization; therefore the signal may be entered from the node D1, or, in selecting the clock information, the node D1 may be set to "INT", and each relay station to "SLV2", by Default.

In this way, there no longer is the need to strictly predetermine the required zone of the redundant configuration prior to installing the wavelength division multiplexing transmission system to form the zone into a ring configuration.

Further, even after new active system and standby system are installed, the base clock signal for clock synchronization can be set easily by entering the control information including the positional information of the nodes and the relay stations; thus, the clock synchronization can be easily achieved between the nodes.

As explained above, in the first embodiment, the following effects will be achieved.

A first effect is to facilitate the monitoring and control of the TPNDs 15A, 16A, 15D and 15D, as the TPNDs 15A and 16A, and the TPND 15D and 15D, which are sets of two, are disposed together in the nodes A1 and D1, respectively. Further, since it is easy to monitor and control the TPND, it is easy to achieve the redundant configuration of the wavelength division multiplexing transmission system, without complicated control of each node.

A second effect is, even when there is no BBTPND, the sending port and the receiving port of the OSCs 10B and 20B and the OSCs 10C and 20C are connected to the receiving and sending ports of the respective opposite OSC through an optical patch cord or an electric cable so as to communicate the information on the number of wavelengths separately from the main signal, thereby eliminating the 3R regeneration relay of the main signal to allow for an economical path construction.

That is, since the configuration is such that the number of multiple wavelengths of the optical signal necessary for the wavelength division multiplexing transmission is transmitted to the downstream node without 3R regeneration relay, the need for the BBTPND on the transmission line between the wavelength division multiplexing transmission system nodes B1 and C1, and B2 and C2 of the intermediate station is eliminated, allowing the cost to be held down.

A third effect is to eliminate the need to strictly predetermine the required zone of the redundant configuration prior to installing the wavelength division multiplexing transmission system to form the zone into a ring configuration since the clock synchronization is achieved between the nodes B1 and C1, and the communication of the SV signal between the OSCs 10B and 10C in the redundant configuration is easily achieved by performing the setting in such as way that, the clock of the signal entered from the outside in the node A1 is selected as the master clock, and the nodes B1, C1 and D1, and the relay stations E1 and F1 are slaves to the clock of the LINE 1 for operation.

A fourth effect is to achieve clock synchronization between the nodes without complicated setting operation for clock synchronization even if new active system or standby system is installed, since the base clock signal for clock synchronization can be set easily by entering the control information including the positional information of the nodes and the relay stations.

Second Embodiment

Figure 8:
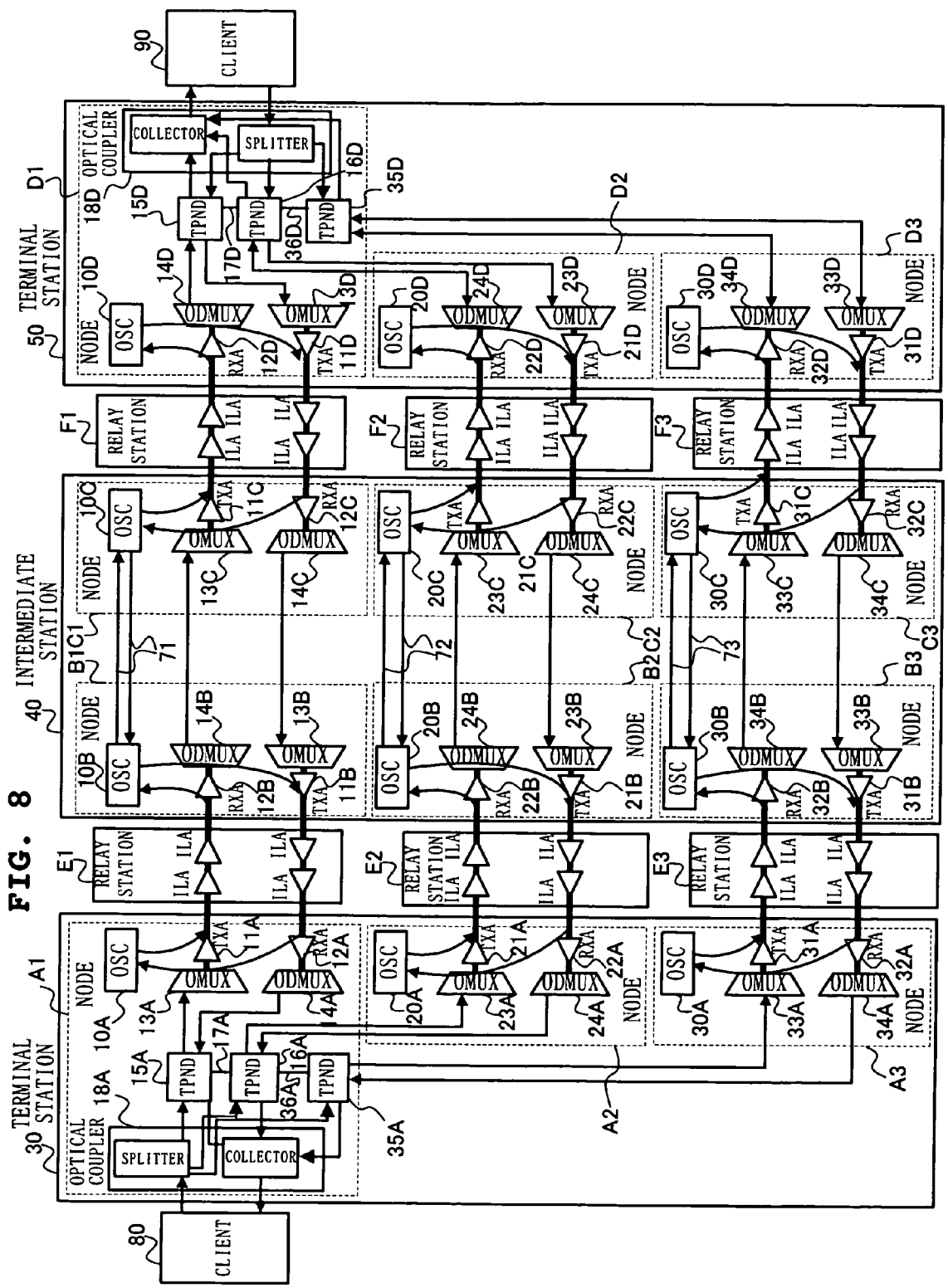
FIG. 8 shows a schematic diagram illustrating the basic configuration of a wavelength division multiplexing transmission system according to a second embodiment of the present invention.

As the second embodiment of the present invention, the configuration is shown in FIG. 8.

Though the basic configuration of the second embodiment is similar to the above first embodiment, the configuration is such that new TPNDs 35A and 35D are added to the nodes A1 and D1, and the standby system nodes A3-D3 are rendered further redundant with the nodes A1-D1 and A2-D2.

In the second embodiment, similarly to the first embodiment, the clock is correctly set by using a craft interface terminal or the like, and entering the control information including the positional information of each node and each relay station into the management control units 60A and 60D.

Since the positional information of each node and each relay station is clear, the user can perform setting easily, without erroneous setting.

Further, even if the configuration is extended, as the TPNDs 15A, 16A and 35A or the TPNDs 15D, 16D and 35D are disposed together in the nodes A1 or D1, the control is easy; thus, the control of the clock synchronization of the optical signal transmission in the active system and standby system can be performed easily without a new complicated control of the nodes and relay stations, improving scalability.

In this way, in the second embodiment, a new standby system can be added without the need to strictly predetermine the required zone of the redundant configuration prior to installing the wavelength division multiplexing transmission system to form the zone into a ring configuration, thus the first embodiment can be easily extended.

Third Embodiment

Figure 9:
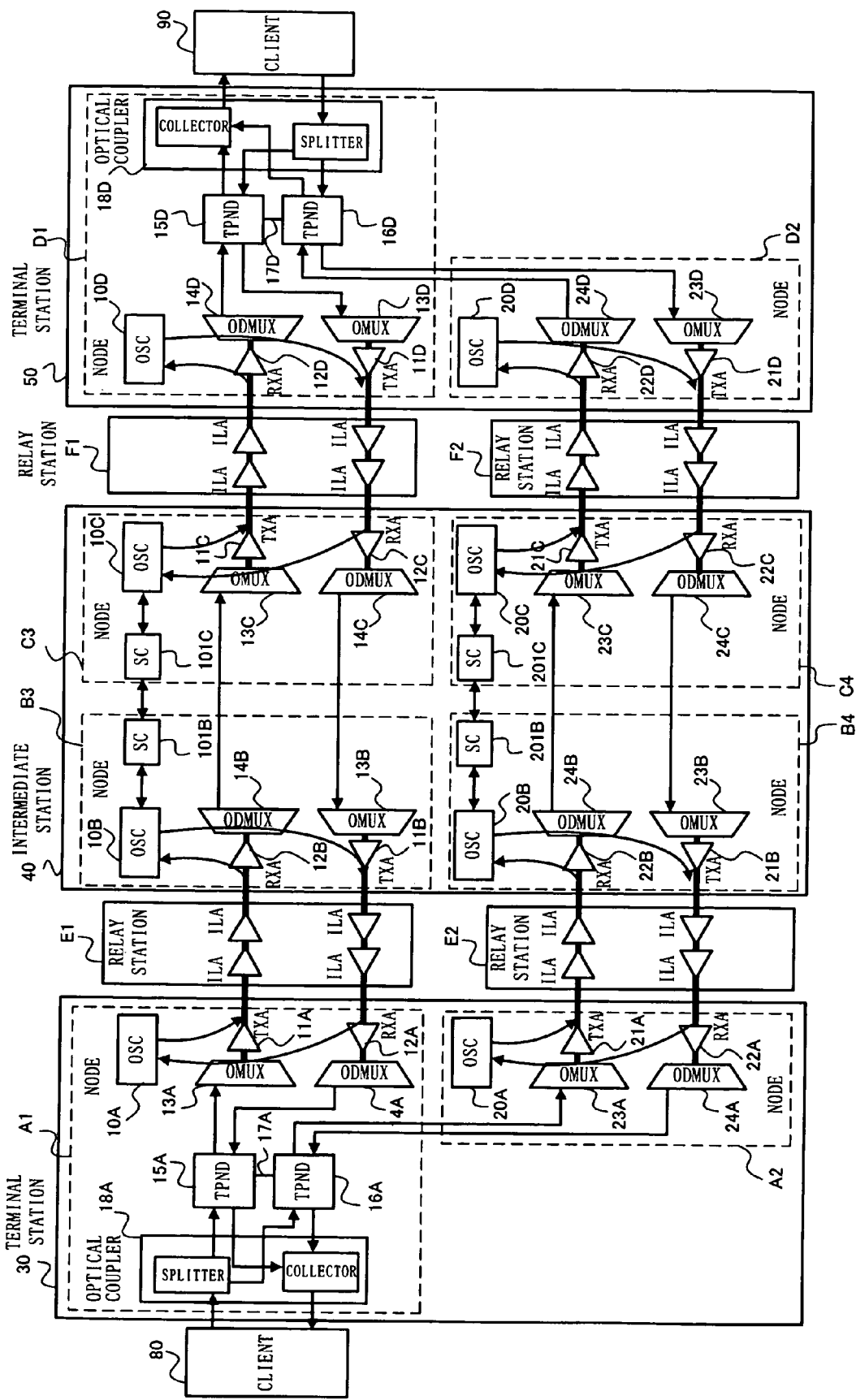
FIG. 9 shows a schematic diagram illustrating the basic configuration of a wavelength division multiplexing transmission system according to a third embodiment of the present invention.

As the third embodiment of the present invention, the configuration is shown in FIG. 9. Though the basic configuration of the third embodiment is similar to the above first embodiment, the transfer of multiple wavelength number information between the nodes B3 and C3, and the nodes B4 and C4 is more sophisticated.

Referring to FIG. 9, in the third embodiment, between the nodes B1 and C1, and between the nodes B2 and C2, the connections between the OSCs 10B and 10C, and the OSCs 20B and 20C are removed, and, instead, an external communication interface unit for entering/delivering the SV signal including the multiple wavelength number information is provided and connects these nodes to one another through system controllers (SC) 101B and 101C and the SCs 201B and 201C, described below, to transmit and receive the number of the multiple wavelengths.

The SCs 101B and 101C are packages, each connected to the OSCs 10B and 10C and the monitoring and control units 60B (not shown) and 60C, monitoring and controlling the overall wavelength division multiplexing transmission system. The SCs 101B and 101C perform setting of each unit within the apparatus through the intra-apparatus communication buses 19B and 19C and the monitoring and control units 60B and 60C, and at the same time, collect information. Further, they are provided with an external interface unit for communicating with a network management system (NMS), a craft interface terminal, and the like.

In addition, the SCs 201B and 201C have also the same configuration and operation as that of the SCs 101B and 101C.

In this way, prescribed control and various settings of the wavelength division multiplexing transmission system can be performed from the outside by the user with the SCs 101B, 101C, 201B and 201C.

In this way, in the embodiment, the number of the multiple wavelengths is transmitted and received between the OSC and the SC, and the number of the multiple wavelengths is transmitted and received between SCs using the external interface for communication, such as bidirectional Ethernet (R).

In the above-mentioned first embodiment, the signal is transmitted between the OSCs 10B and 10C between the nodes B1 and C1, and the OSCs 20B and 20C between the nodes B2 and C2 by using the expensive part of the optical patch cord for connection; however, according to the embodiment, relatively inexpensive and generic Ethernet (R) cable or the like can be used for the transmission within the same zone without using the optical patch cord used in the first embodiment, such that, even with parts costs for the addition of the SC, it is possible to reduce the cost further than the first embodiment.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A wavelength division multiplexing transmission system comprising:
    input/output terminal stations comprising an input/output means for inputting and outputting an optical signal and a wavelength division multiplexing transmission apparatus connected to said input/output means;
    an intermediate station located between said terminal stations and connected to the terminal stations through an optical transmission line for performing wavelength division multiplexing and transmission of said optical signal, a signal transmission system comprising said terminal stations and said intermediate station having a redundant configuration comprising an active system and a standby system; and
    a control unit which is disposed on a side of the active system and coupled to the input/output means through an intra-apparatus control bus and controls a clock synchronization of optical signal transmission on at least one of said active system and said standby system, based on control information determined for the wavelength division multiplexing transmission apparatus,
    wherein said input/output means for the optical signal is provided on said active system and said standby system, on a side of said active system of said terminal stations.

2. The wavelength division multiplexing transmission system as set forth in claim 1, wherein said terminal stations and said intermediate station comprise a plurality of wavelength division multiplexing transmission apparatuses, each comprising said active system and said standby system.

3. The wavelength division multiplexing transmission system as set forth in claim 1, wherein said control unit controls the clock synchronization of optical signal transmission on at least one of said active system and said standby system, based on prescribed control information set based on said redundant configuration.

4. The wavelength division multiplexing transmission system as set forth in claim 1, wherein said terminal stations and said intermediate station comprise a plurality of wavelength division multiplexing transmission apparatuses, each comprising said active system and said standby system, and
wherein said control unit controls the clock synchronization of the optical signal transmission on at least one of said active system and said standby system, based on prescribed control information set based on said redundant configuration, through said input/output means.

5. The wavelength division multiplexing transmission system as set forth in claim 1, wherein said intermediate station comprises:
plural nodes which are connected to said terminal stations through an optical transmission line and perform wavelength division multiplexing and transmission of said optical signal; and
a communication bus different from said optical transmission line for transmitting information on a number of wavelengths from said optical signal between said plural nodes.

6. The wavelength division multiplexing transmission system as set forth in claim 5, wherein said plural nodes comprises:
a first node comprising a first optical supervisory channel; and
a second node comprising a second optical supervisory channel which is connected to said first optical supervisory channel by said communication bus.

7. The wavelength division multiplexing transmission system as set forth in claim 1, wherein the control unit is coupled to the input/output means and the wavelength division multiplexing transmission apparatus.

8. The wavelength division multiplexing transmission system as set forth in claim 1, wherein the intermediate station comprises:
an optical multiplexer which multiplexes plural signals having a plurality of wavelengths and outputs a wavelength multiplexed signal;
an optical supervisory channel which receives a supervisory channel (SV) signal indicating a number of individual wavelengths in the wavelength multiplexed signal;
a transmission amplifier which receives the SV signal from the optical supervisory channel and amplifies the wavelength multiplexed signal from the optical multiplexer;
a control unit which receives the individual wavelength number information from the optical supervisory channel and notifies the optical multiplexer of the individual wavelength number information and performs settings of input ports on the optical multiplexer,
wherein the optical multiplexer detects a power level of an optical signal of the plural signals and determines a number of multiple wavelengths of the optical signal based on the individual wavelength number information and the detected power level of the optical signal.

9. A wavelength division multiplexing transmission system comprising:
terminal stations comprising an input/output means for entering/delivering an optical signal and a wavelength division multiplexing transmission apparatus connected to said input/output means, said terminal stations performing wavelength division multiplexing and transmission of said optical signal, and a signal transmission system comprising said terminal stations having a redundant configuration comprising an active system and a standby system; and
a control unit which is disposed on a side of the active system and coupled to the input/output means through an intra-apparatus control bus and controls a clock synchronization of optical signal transmission on at least one of said active system and said standby system, based on control information determined for the wavelength division multiplexing transmission apparatus,
wherein said input/output means for the optical signal is provided on said active system and said standby system, on a side of said active system of said terminal stations.

10. The wavelength division multiplexing transmission system as set forth in claim 9, wherein said control unit controls the clock synchronization of the optical signal transmission on at least one of said active system and said standby system, based on prescribed control information set based on said redundant configuration, through said input/output means.

11. The wavelength division multiplexing transmission system as set forth in claim 10, wherein said control unit synchronizes the clock signal between said active system and said standby system based on control information determined for each of the wavelength division multiplexing transmission apparatus of said terminal station and the wavelength division multiplexing transmission apparatus of said intermediate station of said active system and said standby system, and
wherein said control information includes positional information indicating where the wavelength division multiplexing transmission apparatus of said terminal station and the wavelength division multiplexing transmission apparatus of said intermediate station are positioned, connection information indicating the connection relationship of the optical signal transmission in at least one of an upstream and a downstream direction, and clock information indicating the master-slave relationship of the base clock signal, which is to be the basis of the clock synchronization.

12. The wavelength division multiplexing transmission system as set forth in claim 10, wherein said control unit synchronizes the clock signal between said active system and said standby system based on control information determined for each of the wavelength division multiplexing transmission apparatus of said terminal station and the wavelength division multiplexing transmission apparatus of said intermediate station of said active system and said standby system,
wherein said control information includes positional information indicating where the wavelength division multiplexing transmission apparatus of said terminal station and the wavelength division multiplexing transmission apparatus of said intermediate station are positioned, connection information indicating the connection relationship of the optical signal transmission in at least one of an upstream and a downstream direction, and clock information indicating the master-slave relationship of the base clock signal, which is to be the basis of the clock synchronization, and
wherein, in the wavelength division multiplexing transmission apparatus of said intermediate station, multiple wavelength number information indicating the number of multiple wavelengths of said optical signal contained in said optical signal to be transmitted is transmitted to said downstream wavelength division multiplexing transmission apparatus through a transmission bus different from the transmission line for the optical signal.

13. The wavelength division multiplexing transmission system as set forth in claim 9, wherein, in the wavelength division multiplexing transmission apparatus of said intermediate station, multiple wavelength number information indicating the number of multiple wavelengths of said optical signal contained in said optical signal to be transmitted is transmitted to said downstream wavelength division multiplexing transmission apparatus through a transmission bus different from the transmission line for the optical signal.

14. The wavelength division multiplexing transmission system as set forth in claim 13, wherein the wavelength division multiplexing transmission apparatus of said intermediate station comprises an external communication interface unit for entering/delivering said multiple wavelength number information.

15. The wavelength division multiplexing transmission system as set forth in claim 13, wherein said communication bus for transmitting said multiple wavelength number information between the wavelength division multiplexing transmission apparatuses of said intermediate station is configured by one of an optical patch cord and an electrical cable.

16. The wavelength division multiplexing transmission system as set forth in claim 13, wherein the wavelength division multiplexing transmission apparatus of said intermediate station comprises an external communication interface unit for entering/delivering said multiple wavelength number information, and
wherein said communication bus for transmitting said multiple wavelength number information between the wavelength division multiplexing transmission apparatuses of said intermediate station is configured by one of an optical patch cord and an electrical cable.

17. The wavelength division multiplexing transmission system as set forth in claim 13, wherein the number of multiple wavelengths of the optical signal transmitted between the wavelength division multiplexing transmission apparatuses of said intermediate station is determined based on said multiple wavelength number information and the power level of the optical signal from which said multiple wavelength number information has been extracted.

18. The wavelength division multiplexing transmission system as set forth in claim 13, wherein the wavelength division multiplexing transmission apparatus of said intermediate station comprises an external communication interface unit for entering/delivering said multiple wavelength number information, and
wherein the number of multiple wavelengths of the optical signal transmitted between the wavelength division multiplexing transmission apparatuses of said intermediate station is determined based on said multiple wavelength number information and the power level of the optical signal from which said multiple wavelength number information has been extracted.

19. The wavelength division multiplexing transmission system as set forth in claim 13, wherein said communication bus for transmitting said multiple wavelength number information between the wavelength division multiplexing transmission apparatuses of said intermediate station is configured by one of an optical patch cord and an electrical cable, and
wherein the number of multiple wavelengths of the optical signal transmitted between the wavelength division multiplexing transmission apparatuses of said intermediate station is determined based on said multiple wavelength number information and the power level of the optical signal from which said multiple wavelength number information has been extracted.

20. The wavelength division multiplexing transmission system as set forth in claim 9, wherein said control unit controls the clock synchronization of the optical signal transmission on at least one of said active system and said standby system, based on prescribed control information set based on said redundant configuration, through said input/output means,
wherein, in the wavelength division multiplexing transmission apparatus of said intermediate station, multiple wavelength number information indicating the number of multiple wavelengths of said optical signal contained in said optical signal to be transmitted is transmitted to said downstream wavelength division multiplexing transmission apparatus through a transmission bus different from the transmission line for the optical signal.

21. A wavelength division multiplexing transmission apparatus comprising:
input/output terminal stations comprising an input/output means for inputting and outputting an optical signal and a wavelength division multiplexing transmission apparatus connected to the input/output means, and performing wavelength division multiplexing and transmission of said optical signal, a signal transmission system comprising said terminal stations having a redundant configuration comprising an active system and a standby system; and
a control unit which is disposed on a side of the active system and coupled to the input/output means through an intra-apparatus control bus and controls a clock synchronization of optical signal transmission on at least one of said active system and said standby system, based on control information determined for the wavelength division multiplexing transmission apparatus,
wherein said input/output means for an optical signal to be transmitted through at least one of said active system and said standby system is provided on said active system and said standby system, on a side of said active system of said terminal stations.

22. The wavelength division multiplexing transmission apparatus as set forth in claim 21, wherein said terminal station comprises a plurality of wavelength division multiplexing transmission means, each comprising said active system and said standby system.

23. The wavelength division multiplexing transmission apparatus as set forth in claim 21, wherein said control unit controls the clock synchronization of the optical signal transmission on at least one of said active system and said standby system, based on prescribed control information set based on said redundant configuration, through said input/output means.

24. The wavelength division multiplexing transmission apparatus as set forth in claim 21, wherein said terminal station comprises a plurality of wavelength division multiplexing transmission means, each comprising said active system and said standby system, and
wherein said control unit controls the clock synchronization of the optical signal transmission on at least one of said active system and said standby system, based on prescribed control information set based on said redundant configuration, through said input/output means.

25. A method for controlling a wavelength division multiplexing transmission apparatus comprising input/output terminal stations comprising an input/output means for inputting and outputting an optical signal, and performing wavelength division multiplexing and transmission of said optical signal, comprising:

rendering a signal transmission system comprising said terminal stations a redundant configuration comprising an active system and a standby system, and providing said input/output means for the optical signal on said active system and said standby system, on a side of said active system of said terminal station, and controlling, using a control unit disposed on a side of the active system and coupled to the input/output means through an intra-apparatus control bus, the clock synchronization of the optical signal transmission on at least one of said active system and said standby system, based on prescribed control information set based on said redundant configuration, through said input/output means.

26. The method for controlling the wavelength division multiplexing transmission apparatus as set forth in claim 25, further comprising:

synchronizing the clock signal of said active system and said standby system based on control information determined for each of the wavelength division multiplexing transmission apparatus of said terminal station and the wavelength division multiplexing transmission apparatus of said intermediate station of said active system and said standby system, wherein said control information includes positional information indicating where the wavelength division multiplexing transmission apparatus of said terminal station and the wavelength division multiplexing transmission apparatus of said intermediate station are positioned, connection information indicating the connection relationship of the optical signal transmission in at least one of an upstream and a downstream direction, and clock information indicating the master-slave relationship of the base clock signal, which is to be the basis of the clock synchronization.

27. The method for controlling the wavelength division multiplexing transmission apparatus as set forth in claim 25, further comprising:

in the wavelength division multiplexing transmission apparatus of said intermediate station, transmitting multiple wavelength number information indicating the number of the multiple wavelengths of said optical signal contained in said optical signal to be transmitted to said downstream wavelength division multiplexing transmission apparatus through a transmission bus different from the transmission line of said optical signal.

28. The method for controlling the wavelength division multiplexing transmission apparatus as set forth in claim 27, further comprising:

determining the number of multiple wavelengths of the optical signal transmitted between the wavelength division multiplexing transmission apparatuses of said intermediate station based on said multiple wavelength number information and the power level of the optical signal from which said multiple wavelength number information has been extracted.

29. The method for controlling the wavelength division multiplexing transmission apparatus as set forth in claim 25, further comprising:

synchronizing the clock signal of said active system and said standby system based on control information determined for each of the wavelength division multiplexing transmission apparatus of said terminal station and the wavelength division multiplexing transmission apparatus of said intermediate station of said active system and said standby system, wherein said control information includes positional information indicating where the wavelength division multiplexing transmission apparatus of said terminal station and the wavelength division multiplexing transmission apparatus of said intermediate station are positioned, connection information indicating the connection relationship of the optical signal transmission in at least one of an upstream and a downstream direction, and clock information indicating the master-slave relationship of the base clock signal, which is to be the basis of the clock synchronization, and in the wavelength division multiplexing transmission apparatus of said intermediate station, transmitting multiple wavelength number information indicating the number of the multiple wavelengths of said optical signal contained in said optical signal to be transmitted to said downstream wavelength division multiplexing transmission apparatus through a transmission bus different from the transmission line of said optical signal.

30. The wavelength division multiplexing transmission system as set forth in claim 1, wherein said input/output terminal stations comprise an optical coupler for splitting an optical signal received from a client and collecting optical signals to deliver to said client.

31. The wavelength division multiplexing transmission system as set forth in claim 30, wherein said input/output means comprises:

a first transponder for entering an optical signal from said optical coupler and delivering an optical signal to said optical coupler in said active system; and a second transponder which is interconnected with said first transponder, for entering an optical signal from said optical coupler and delivering an optical signal to said optical coupler in said standby system.

32. The wavelength division multiplexing transmission system as set forth in claim 31, wherein said first transponder comprises a first firmware unit for monitoring a signal condition of said second transponder, and said second transponder comprises a second firmware unit for monitoring a signal condition of said first transponder.

33. The wavelength division multiplexing transmission system as set forth in claim 32, further comprising:

a monitoring and control unit which is formed on the side of said active system and connected to said first and second firmware units, for monitoring and controlling an operation of said first and second transponders.

* * * * *